March 2, 1943. A. P. FERGUESON ET AL 2,312,537
FENDER SHIELD LATCH MECHANISM
Filed Oct. 6, 1941 2 Sheets-Sheet 1
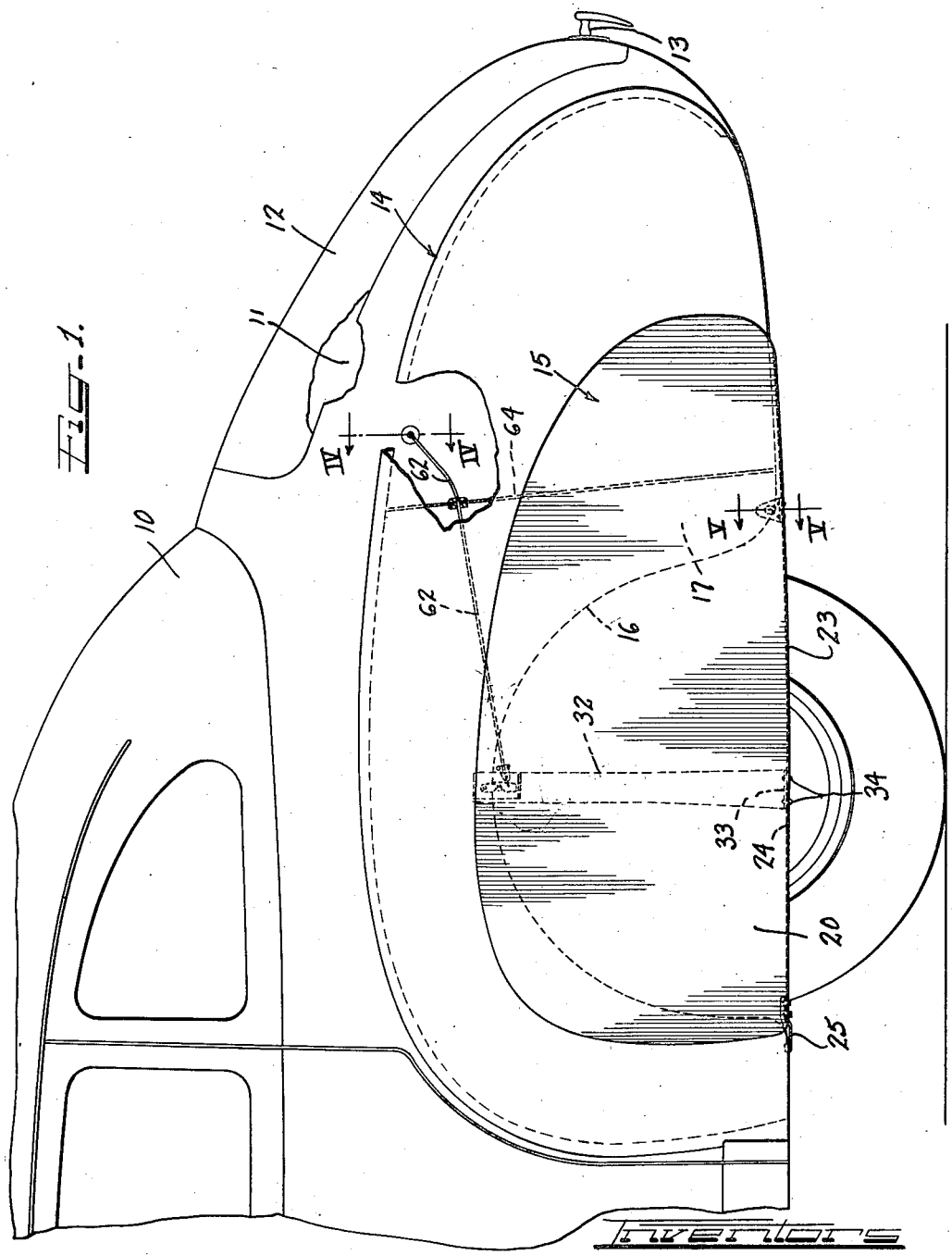

March 2, 1943.  A. P. FERGUESON ET AL  2,312,537
FENDER SHIELD LATCH MECHANISM
Filed Oct. 6, 1941  2 Sheets-Sheet 2
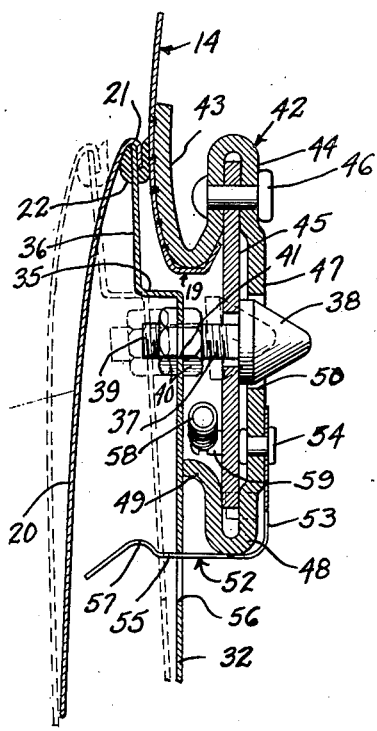
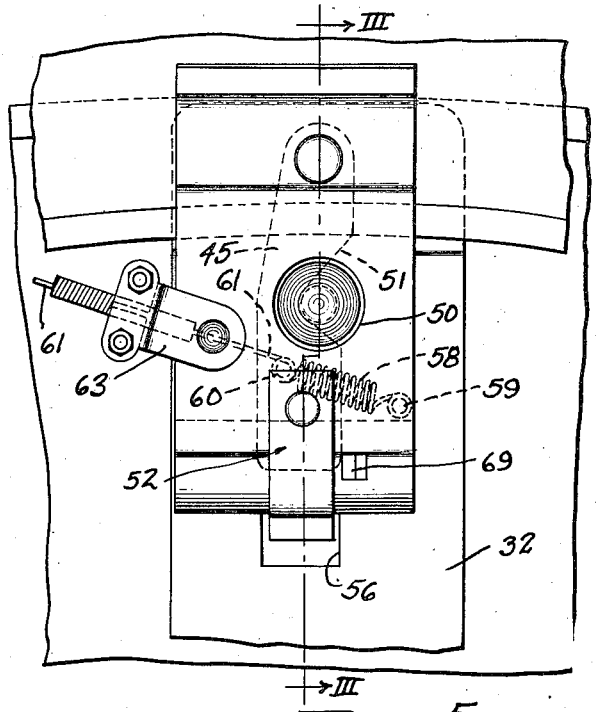
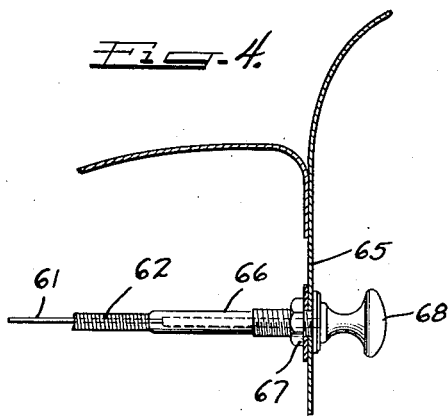
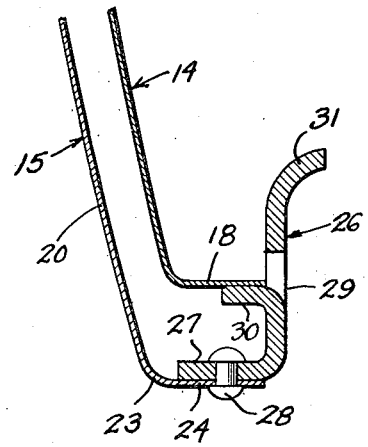
Inventors
ARTHUR P. FERGUESON.
WILLIAM B. SCHUEREN.

Patented Mar. 2, 1943

2,312,537

UNITED STATES PATENT OFFICE 2,312,537

FENDER SHIELD LATCH MECHANISM

Arthur P. Fergueson and William B. Schueren, Detroit, Mich., assignors to Houdaille-Hershey Corporation, Detroit, Mich., a corporation of Michigan Application October 6, 1941, Serial No. 413,802

4 Claims. (Cl. 292—225)

This invention relates to a fender shield latch mechanism, and more particularly, to a fender shield latch mechanism which includes means for preventing the unauthorized removal of the fender shield from the fender.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening.

Due to the location and accessibility of the fender shields on the vehicle, it has been found that these shields are frequently stolen or otherwise removed by unauthorized persons. One of the features of the present invention is to provide a latch mechanism which includes means for preventing the unauthorized removal of the fender shield from the fender.

As the term, "fender shield" shall hereinafter be employed, it refers to any member which is adapted to be secured to a fender or other portion of a vehicle body for the purpose of covering the opening in the fender or vehicle body which is provided for access to or removal of the vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a fender shield latch mechanism which includes means for preventing the unauthorized removal of the fender shield from the fender.

It is a further object of this invention to provide a fender and fender shield assembly which includes means for locking the fender shield in place on the vehicle fender.

It is a still further object of the present invention to provide a fender shield latch mechanism having locking means associated therewith which is operated from an interior portion of the vehicle.

Another object of this invention is to provide a fender shield latch mechanism having means for operating the latch mechanism located in the trunk or luggage compartment of the vehicle.

Another and further object of the present invention is to provide a fender shield latch mechanism having an operating member which is connected to the latch mechanism proper by a flexible cable.

The novel features which we believe to be characteristic of our invention are set forth with particularity in the appended claims. Our invention itself, however, both as to its organization and manner of construction, together with further objects and advantages thereof, may best be understood by reference to the accompanying drawings, in which:

Figure 1 is an elevational view of the rear portion of an automobile having a fender shield mounted on the fender over the wheel opening therein;

Figure 2 is an enlarged rear elevational view of the latching mechanism on the fender shield shown on Figure 1;

Figure 3 is a fragmentary vertical sectional view through the latch mechanism shown in Figure 2, as taken along the line III—III;

Figure 4 is a sectional view through the body of the vehicle and fender showing the latch mechanism control knob; and, Figure 5 is a fragmentary sectional view of the lower rear guide bracket of the fender shield, as taken along the line V—V of Figure 1.

Referring now to the various figures of the drawings, which illustrate one embodiment of the present invention, there is illustrated therein the rear portion of a vehicle 10 having a luggage or storage compartment 11 in the rear thereof, which is closed by the cover member 12 and which cover member 12 may be locked in its closed position by a conventional locking mechanism 13.

The vehicle 10 is also provided with a rear fender 14 and a fender shield 15 which is mounted on the fender over the wheel access opening 16 in the outer depending side wall 17 of the fender 14. While the fender 14 may assume a wide variety of shapes without departing from the spirit and scope of the present invention, and may, indeed, be formed integral and made a part of the body itself (not shown), the fender 14 has been illustrated as being of a high crowned type, which is employed on one of the conventional automobiles of the present day.

The fender 14 is provided with a bent back base flange 18 along its lower edge and is also provided with a folded marginal flange 19 around the opening 16, as is clearly shown in Figures 2 and 3, respectively. These flange portions 18 and 19 of the fender 14 stiffen the fender in a manner well known to those skilled in the art.

The fender shield 15 comprises a panel portion 20 which has a rolled curved edge 21 which is arranged to overlap the opening 16 in the fender 14 and to be seated thereon. This rolled edge 21 is preferably equipped with a rubber cushioning bead or strip 22 which prevents a direct metal to metal contact between the marginal edge of the fender shield 15 and the fender 14. The lower edge 23 of the fender shield 15 has a bent back base flange 24.

At the forward corner of the fender shield a hook arm 25 is provided which is arranged to extend out under and around the base flange 24 of the fender 14. The hook arm 25 forms no part of the present invention, but for the purpose of this application it will be understood that the hook arm provides not only vertical support for the fender shield 15 but also holds the lower forward corner of the fender shield 15 tightly against the fender 14.

Mounted on the fender shield 15 opposite the lower rear corner of the opening 16 in the fender 14 is a guide aligning bracket 26, which includes a base portion 27 that is riveted as at 28 to the base flange 24 of the fender shield 15, and an upstanding portion 29 which bears against the rear edge of the base flange 18 of the fender 14 and holds the trailing end of the fender shield 15 tightly against the fender. A tongue 30 is struck out of the upstanding portion 29 of the guide bracket 26 and acts as an aligning means for aligning the lower edge of the fender shield 15 with respect to the fender 14. This tongue 30 is arranged to bear against the under side of the base flange 18 of the fender 14. The upper extremity of the upstanding portion 29 of the guide bracket 26 is rolled back as at 31 to provide a cam surface for facilitating upward movement of the guide bracket into position against the base flange 18 of the fender 14.

Extending across the rear face of the fender shield 15 from the lower base flange 24 to the top of the shield is a strut 32. The strut 32 has a foot portion 33 which is riveted as at 34 to the base flange 24 of the fender shield 15. The strut 32 extends upwardly behind the rear face of the panel portion 20 of the fender shield 15 and is spaced therefrom. The top portion of the strut 32 is bent first towards the face of the fender shield as at 35 and then upwardly as at 36 into engagement with the rolled edge 21 of the fender shield 15.

A latching stud 37 having an enlarged tapered head portion 38 and a threaded shank portion 39 is secured to the strut 32 in proximity to the bent back portion 35. The threaded shank portion 39 is provided with nuts 40 which clamp the stud in adjusted position on the strut 32, the strut 32 being provided with an opening 41 through which the threaded shank 39 extends.

Mounted on the fender 14 is a bracket 42 having a tail portion 43 which is shaped to fit against the rear face of the fender 14 and the bent flange portion 19. The tail portion 43 is spot welded or otherwise suitably secured to the rear face of the fender 14 and provides a permanent attachment thereon. The bracket 42 has an open fold 44 adjacent the tail portion 43 which carries a lever member 45 which is pivotally mounted thereon by means of a rivet 46. The principal body portion 47 of the bracket 42 extends downwardly from the open fold 44 and terminates in a second opened fold 48 having a forwardly bent lip 49. It will be understood that the lower end of the lever 45 is arranged to slide into the lower fold 48 of the bracket 42. The principal body portion 47 of the bracket 42 is provided with an enlarged opening 50 through which the head 38 of the stud 37 may extend. The lever 45 is provided with a triangularly shaped cut-out 51 along one edge thereof to enable the lever 45 to be moved into position behind the head 38 of the stud 37.

The head 38 of the stud 37 is so adjusted with respect to the strut 32 of the fender shield 15 that when the lever 45 is forced into position behind the head 38 the fender shield 15 is pulled tightly against the fender 14 along its upper edge. The fender shield 15 is preferably of the type which has to be wrapped or warped into position against the fender so that the entire shield is under stress in its mounted position. This may be obtained by shaping the fender shield originally so that it diverges gradually away from the fender from the bottom to the top of the shield in its unstressed condition. When the top of the fender shield is forced against the fender, the shield is warped into place so that the entire peripheral edge of the fender shield along its top and both ends is pressed tightly against the fender 14 and maintained there under stress.

Due to this stressed condition of the fender shield when in mounted engagement on the fender, it is not necessary to provide vertical support for the fender shield at its rear or trailing end. In order to prevent the fender shield from falling to the ground when the latch is originally released and the fender shield moves into an unstressed condition, as shown by the dotted lines in Figure 3, a spring steel finger 52 is provided. The spring finger 52 is of generally L-shape having one leg 53 riveted as at 54 to the bracket 42. The other leg 55 extends forwardly through an opening 56 in the strut 32 and terminates in a hump-shaped end portion 57. It will be observed that as the fender shield 15 moves from its full lined or stressed position in Figure 3, to its dotted lined or unstressed position, the upper edge of the opening 56 of the strut 32 remains in contact with the finger 52. This provides vertical support for the fender shield in its unstressed position.

The remote control means for operating the lever 45 will now be described. A coil spring 58 is connected between a pin 59 on the bracket 42 and a pin 60 on the lever member 35. This is a tension spring and provides a biasing force for pulling the lever member 45 towards its latched position behind the head 38 of the stud 37.

A flexible wire or cable 61 is connected at one end to the pin 60 on the lever member 45. The flexible wire extends through a flexible covering or casing 62 from a bracket 63 which supports one end of the casing or covering 62, back through the splash plate 64 of the fender 14 to the wall 65 of the luggage compartment 11 of the vehicle 10. The end of the casing 62 adjacent the wall 65 is provided with a suitable terminal portion 66 which is anchored and secured to the wall portion 65 by a nut 67. The end of the flexible wire or flexible cable 61 is secured to an operating knob 68.

From an inspection of Figures 1, 2 and 4 of the drawings, it will be understood that when the knob 68 is pulled away from the wall 65 the lever member 45 is pulled out of engagement with the head 38 of the stud 37, which enables the head 38 to move past the lever member 45. Due to the fact that the fender shield is in a stressed condition when in mounted position on the fender, it will be understood that when the knob 68 is pulled the inherent flexibility and resiliency of the fender shield 15 will cause the shield to snap from the position as shown in full line in Figure 3 to the position as shown by the dotted line. In this position it may be readily and quickly lifted out of engagement with the fender. As soon as the knob 68 is released the tensioning spring 58 moves the lever member 45 back to its normal position for locking engagement with the head 38. In order to limit the backward movement of the lever member 45 when the fender shield is not on the fender, a stop is preferably provided in the bracket 42 by striking out a tongue 69 which is arranged to limit the movement of the lever member 45 by the spring 58. It will be observed, from an inspection of Figure 2, that the lever member 45 does not reach its limiting position when the latching stud 37 is in position for under such circumstances the lever member 45 strikes the stud 37 before it reaches the limit stop 69.

To mount the fender shield 15 on the fender 14, the shield is lifted to a position opposite the opening 16 and the hook-shaped forward support arm 25 is hooked over the base edge 18 of the fender 14. The rear edge is then lifted up until the aligning tongue 30 strikes the base flange 18 of the fender 14 and until the upright portion 29 of the aligning and guide bracket 26 is in tight engagement behind the rear edge of the base flange 18. The top edge of the fender shield is then pushed toward the fender 14 to force the tapered head 38 of the stud 37 against the lever member 45. The tapered head portion 38 cams the lever member 45 past the enlarged rear end of the head 38 and thereafter the lever member 45 is snapped by the spring 58 behind the enlarged rear end of the head 38. This holds the fender shield 15 in a stressed condition against the fender 14.

Since the means for operating the lever latching member 45 is located in a compartment in the vehicle to which access may be had only by unlocking the locking means 13 on the cover 12 of the compartment, it will be readily understood that the above described latching mechanism for the fender shield will prevent, or at least greatly reduce, unauthorized removal of the fender shield from the fender.

While we have shown a particular embodiment of our invention, it will, of course, be understood that we do not wish to be limited thereto, since many modifications may be made, and we, therefore, contemplate by the appended claims to cover all such modifications as fall within the true spirit and scope of our invention.

Ws claim as our invention:

1. A fender shield latching mechanism for securing a fender shield to a vehicle which includes a latching element mounted on the vehicle for movement between a latching position and an unlatched position relative to a keeper element on the shield, means on said vehicle remote from said shield for controlling the movements of said element from one of said positions to the other of said positions, and a resilient supporting finger on said latching mechanism for temporarily supporting said shield when said latching element is first moved to its unlatched position.

2. A fender shield latching mechanism for securing a fender shield to a vehicle which comprises a bracket secured to the vehicle and bent to have oppositely facing open folds, a latching lever pivotally mounted on said bracket within one of said folds, the free end of said lever being movable into and out of the other of said open folds, said bracket member having an opening therethrough opposite an intermediate portion of said lever for receiving a headed keeper stud on the shield, said lever having a cut back portion along one edge thereof opposite said opening in said bracket, said lever being arranged for latching position behind the stud head with said cut back portion partially extending around the stud, resilient tensioning means extending between said lever and said bracket for normally urging said lever to latching position, a manually operated member on said vehicle located at a point remote from said fender shield, and a flexible cable connecting said lever to said member whereby movement of said member will move said lever to stud releasing position.

3. A fender shield latching mechanism for securing to a vehicle a fender shield having a strut extending across the rear face thereof, which comprises a fixed bracket on said vehicle, a latching element pivotally mounted on said bracket for cooperation with a headed keeper stud on said strut, said latching element being movable into position behind the stud head to hold said shield in latched position on said vehicle, said strut having an opening therethrough below the stud, and a resilient finger mounted on said bracket and extending forwardly through said opening in said strut for temporarily supporting said shield when said latch is moved out of engagement with the stud, and means for moving said latching element.

4. Latching structure for latching a fender shield to a fender comprising a bracket on the fender bent to have oppositely facing open folds, a latching lever pivotally mounted on said bracket within one of said folds for cooperation with a headed keeper stud on the shield, the free end of said lever being movable into and out of the other of said open folds, a spring for swinging said lever against the stud into latching position behind the stud head upon passage of said stud into said bracket, and means accessible only from inside of the vehicle for unlatching said lever from said stud.

ARTHUR P. FERGUESON.
WILLIAM B. SCHUEREN.